United States Patent
Tiirola et al.

(10) Patent No.: US 9,743,389 B2
(45) Date of Patent: Aug. 22, 2017

(54) PHYSICAL UPLINK CONTROL CHANNEL RESOURCE ALLOCATION FOR MULTIPLE CHANNEL STATE INDICATORS COLLIDING IN SAME SUBFRAME

(71) Applicant: Nokia Solutions and Networks Oy, Espoo (FI)

(72) Inventors: Esa Tapani Tiirola, Kempele (FI); Timo Erkki Lunttila, Espoo (FI); Kari Juhani Hooli, Oulu (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 157 days.

(21) Appl. No.: 14/356,675

(22) PCT Filed: Nov. 7, 2012

(86) PCT No.: PCT/EP2012/072006
§ 371 (c)(1),
(2) Date: May 7, 2014

(87) PCT Pub. No.: WO2013/068386
PCT Pub. Date: May 16, 2013

(65) Prior Publication Data
US 2014/0286296 A1 Sep. 25, 2014

Related U.S. Application Data

(60) Provisional application No. 61/556,553, filed on Nov. 7, 2011.

(51) Int. Cl.
*H04L 5/00* (2006.01)
*H04W 72/04* (2009.01)

(52) U.S. Cl.
CPC ......... *H04W 72/0413* (2013.01); *H04L 5/001* (2013.01); *H04L 5/0035* (2013.01);
(Continued)

(58) Field of Classification Search
CPC .. H04W 72/0413; H04L 5/001; H04L 5/0035; H04L 5/0044; H04L 5/0055; H04L 5/0057; H04L 5/0058
See application file for complete search history.

(56) References Cited

U.S. PATENT DOCUMENTS 8,520,491 B2 * 8/2013 Lunttila ................. H04L 5/001
  370/203
9,119,101 B2 * 8/2015 Liu ....................... H04W 24/10
(Continued)

*Primary Examiner* — Parth Patel
*Assistant Examiner* — Kai Chang
(74) *Attorney, Agent, or Firm* — Harrington & Smith

(57) ABSTRACT

Disclosed are a method and a corresponding apparatus relating to wireless telecommunication systems and more particularly to efficient resource allocation schemes supporting transmission of multiple periodic channel state information (CSI) reports on the physical uplink control channel (PUCCH) during the same subframe while maintaining single carrier properties of the transmitted signal. The method includes determining that at least two reports to be transmitted on an uplink resource collide with respect to the uplink resource, applying at least one resource selection policy to the at least two reports and selecting a resource to be used for transmitting a plurality of the at least two reports.

24 Claims, 5 Drawing Sheets

US 9,743,389 B2

Page 2

(52) U.S. Cl.
CPC ......... *H04L 5/0044* (2013.01); *H04L 5/0057* (2013.01); *H04L 5/0058* (2013.01); *H04L 5/0055* (2013.01)

(56) References Cited

U.S. PATENT DOCUMENTS

| | | | | |
|---|---|---|---|---|
| 2009/0196247 | A1 | 8/2009 | Fan et al. | 370/329 |
| 2011/0194445 | A1* | 8/2011 | Riddington | H04L 1/0003 370/252 |
| 2011/0242982 | A1 | 10/2011 | Lunttila et al. | 370/241 |
| 2011/0249578 | A1* | 10/2011 | Nayeb Nazar | H04L 1/0027 370/252 |
| 2012/0039252 | A1* | 2/2012 | Damnjanovic | H04L 1/0026 370/328 |
| 2012/0076028 | A1* | 3/2012 | Ko | H04L 1/0026 370/252 |
| 2012/0120817 | A1* | 5/2012 | Khoshnevis | H04L 1/0026 370/252 |
| 2012/0127869 | A1* | 5/2012 | Yin | H04L 1/0031 370/252 |
| 2012/0140649 | A1* | 6/2012 | Choudhury | H04W 24/10 370/252 |
| 2012/0140708 | A1* | 6/2012 | Choudhury | H04W 72/082 370/328 |
| 2012/0195185 | A1* | 8/2012 | Kumar | H04L 1/1607 370/216 |
| 2012/0201154 | A1* | 8/2012 | Chandrasekhar | H04W 24/10 370/252 |
| 2012/0201207 | A1* | 8/2012 | Liu | H04W 24/10 370/329 |
| 2012/0314613 | A1* | 12/2012 | Zhang | H04B 7/0486 370/252 |
| 2013/0003788 | A1* | 1/2013 | Marinier | H04B 7/024 375/219 |
| 2013/0039231 | A1* | 2/2013 | Wang | H04W 24/10 370/280 |
| 2013/0083748 | A1* | 4/2013 | Li | H04L 5/14 370/329 |
| 2013/0094479 | A1* | 4/2013 | Park | H04L 1/0077 370/336 |
| 2013/0114455 | A1* | 5/2013 | Yoo | H04W 24/00 370/252 |
| 2013/0114554 | A1* | 5/2013 | Yang | H04W 24/10 370/329 |
| 2013/0121299 | A1* | 5/2013 | Kim | H04L 5/001 370/329 |
| 2013/0286970 | A1* | 10/2013 | Wang | H04W 72/04 370/329 |
| 2014/0044083 | A1* | 2/2014 | Kim | H04L 5/001 370/329 |
| 2014/0086174 | A1* | 3/2014 | Nam | H04L 1/0003 370/329 |

\* cited by examiner

PHYSICAL UPLINK CONTROL CHANNEL RESOURCE ALLOCATION FOR MULTIPLE CHANNEL STATE INDICATORS COLLIDING IN SAME SUBFRAME

CROSS-REFERENCE TO RELATED APPLICATION

The present application is related to, claims the priority of, and incorporates by reference in its entirety U.S. Provisional Patent Application No. 61/556,553, filed Nov. 7, 2011.

BACKGROUND

Field

Certain embodiments relate to wireless telecommunication systems and more particularly to efficient resource allocation schemes supporting transmission of multiple periodic channel state information (CSI) reports on the physical uplink control channel (PUCCH) during the same subframe while maintaining single carrier properties of the transmitted signal. Periodic channel state information can include channel quality indicator (CQI), precoder matrix indicator (PMI), rank indicator (RI), precoder type indicator (PTI) etc. Certain embodiments may be related, for example, to long term evolution (LTE) advanced (LTE-A).

Description of the Related Art

When there is simultaneous transmission of multiple periodic channel state information reports on a physical uplink control channel (during the same subframe) there may be a need to select the physical uplink control channel resource among multiple channel state information reporting resources that collide in the same subframe. For example, this kind of functionality may be needed in future generations of channel state indicators if the single carrier properties of the transmitted signal are maintained.

Resource consumption in the case of future generations of channel state indicator reports may be a concern, considering that release 10 (Rel-10) carrier aggregation (CA) relies on per-cell reporting/configuration. The benefit of this approach is that configuration is very modular in the sense that channel state information reporting corresponding to multiple cells can be configured independently. A challenge of this approach is that the physical uplink control channel resource consumption increases linearly with the number of cells configured.

Moreover, the carrier aggregation framework may also be applied to coordinated multipoint (CoMP) feedback. This approach will increase the physical uplink control channel resource consumption considerably, considering that coordinated multipoint feedback relates to user equipment (UE) specific signaling. Furthermore, when considering the combination of carrier aggregation and/or with time division multiplexed (TDM) enhanced interference control interference coordination (eICIC), resource specific channel state information reports will increase the number of independent channel state information reports even further, potentially (for example) doubling the number of periodic channel state information reports.

Hence, it may be desirable to have a resource allocation principle that minimizes the physical uplink control channel resource consumption and is able to capitalize the entire capacity of the physical uplink control channel container (e.g., Format 3) while maintaining the existing (modular) configuration for the periodic channel state information reports.

SUMMARY

According to certain embodiments, a method includes determining that at least two reports to be transmitted on an uplink resource collide with respect to the uplink resource. The method further includes applying at least one resource selection policy to the at least two reports. The method additionally includes selecting a resource and format to be used for transmitting a plurality of the at least two reports.

In certain embodiments, the at least two reports includes at least one channel state information report. The at least two reports, in certain embodiments, further include at least one additional channel state information report (of a same or different type from the first channel state indicator report) or at least one hybrid automatic repeat request acknowledgment. The at least two reports, in certain embodiments, further includes at least one channel state information report related to at least one of carrier aggregation and/or coordinated multipoint operation.

In certain embodiments, the policy is a standardized policy. The policy is, in certain embodiments, selecting a resource with a largest or smallest resource index. In certain embodiments, the resource selection policy is based on a cell index to which the report relates. In certain embodiments, a report corresponding to a primary cell is given a lowest priority. In certain embodiments, the policy further comprises determining a maximum number of channel state information reports that are to be provided in a single sub-frame.

In certain embodiments, the resource is a separate, predetermined resource that is configured to use a physical uplink control channel format or physical uplink shared channel format, optionally with a larger payload.

In certain embodiments, the resource is selected based on a maximum payload supported.

According to certain embodiments, a computer readable medium, such as a non-transitory computer readable medium, is encoded with instructions that, when executed in hardware, perform a method. The method may be any of the method embodiments described above.

An apparatus according to certain embodiments includes means for determining that at least two reports to be transmitted on an uplink resource collide with respect to the uplink resource. The apparatus further includes means for applying at least one resource selection policy to the at least two reports. The apparatus additionally includes means for selecting a resource to be used for transmitting a plurality of the at least two reports. The apparatus may include means for the various variations of the method embodiments described above.

An apparatus includes, in certain embodiments, at least one processor and at least one memory including computer program instructions. The at least one memory and the computer program instructions are configured to, with the at least one processor, cause the apparatus at least to determine that at least two reports to be transmitted on an uplink resource collide with respect to the uplink resource. The at least one memory and the computer program instructions are also configured to, with the at least one processor, cause the apparatus at least to apply at least one resource selection policy to the at least two reports. The at least one memory and the computer program instructions are further configured to, with the at least one processor, cause the apparatus at least to select a resource to be used for transmitting a plurality of the at least two reports. The apparatus may be configured to perform the various variations of the method embodiments described above.

BRIEF DESCRIPTION OF THE DRAWINGS

For proper understanding of the invention, reference should be made to the accompanying drawings, wherein.

DETAILED DESCRIPTION

Certain embodiments provide for physical uplink control channel (PUCCH) resource allocation for channel state information reports in enhanced communication systems. When there is a need to transmit multiple periodic channel state information (CSI) reports simultaneously (in the same subframe), certain embodiments provide the eNodeB and the user equipment (UE) with resource allocation rules for selecting what physical uplink control channel resource the user equipment should use.

Thus, certain embodiments relate to communication systems such as long term evolution (LTE) advanced. More specifically, channel state information signaling in the uplink (UL) in the case of carrier aggregation and/or coordinated multipoint (CoMP). The main focus is on the efficient resource allocation schemes supporting transmission of multiple periodic channel state indicator reports on the physical uplink control channel during the same subframe while maintaining single carrier properties of the transmitted signal. Periodic channel state information reports can include channel quality indicator (CQI), precoder matrix indicator (PMI), rank indicator (RI), precoder type indicator (PTI), etc.

Thus, certain embodiments can provide for more sophisticated multiplexing options supporting simultaneous transmission of channel state information reports for multiple component carriers (CCs) than in the Release 10 (Rel-10) version of the 3rd generation partnership project (3GPP).

Potential uplink (UL) control signaling issues that may be addressed by certain embodiments can include any or all of the following: multiple periodic channel state information reports in a subframe, a periodic channel state information report (or more than one) with a hybrid automatic repeat request (HARQ) acknowledgment (HARQ-ACK) in a subframe, a periodic channel state information report with a sounding reference signal (SRS) in a subframe, simultaneous physical uplink shared channel (PUSCH) with sounding reference signal, and hybrid automatic repeat request acknowledgment bundling. Other combinations are also possible. Embodiments can be addressed to, for example, scenarios with two or more aggregated component carriers (CCs).

Figure 1:
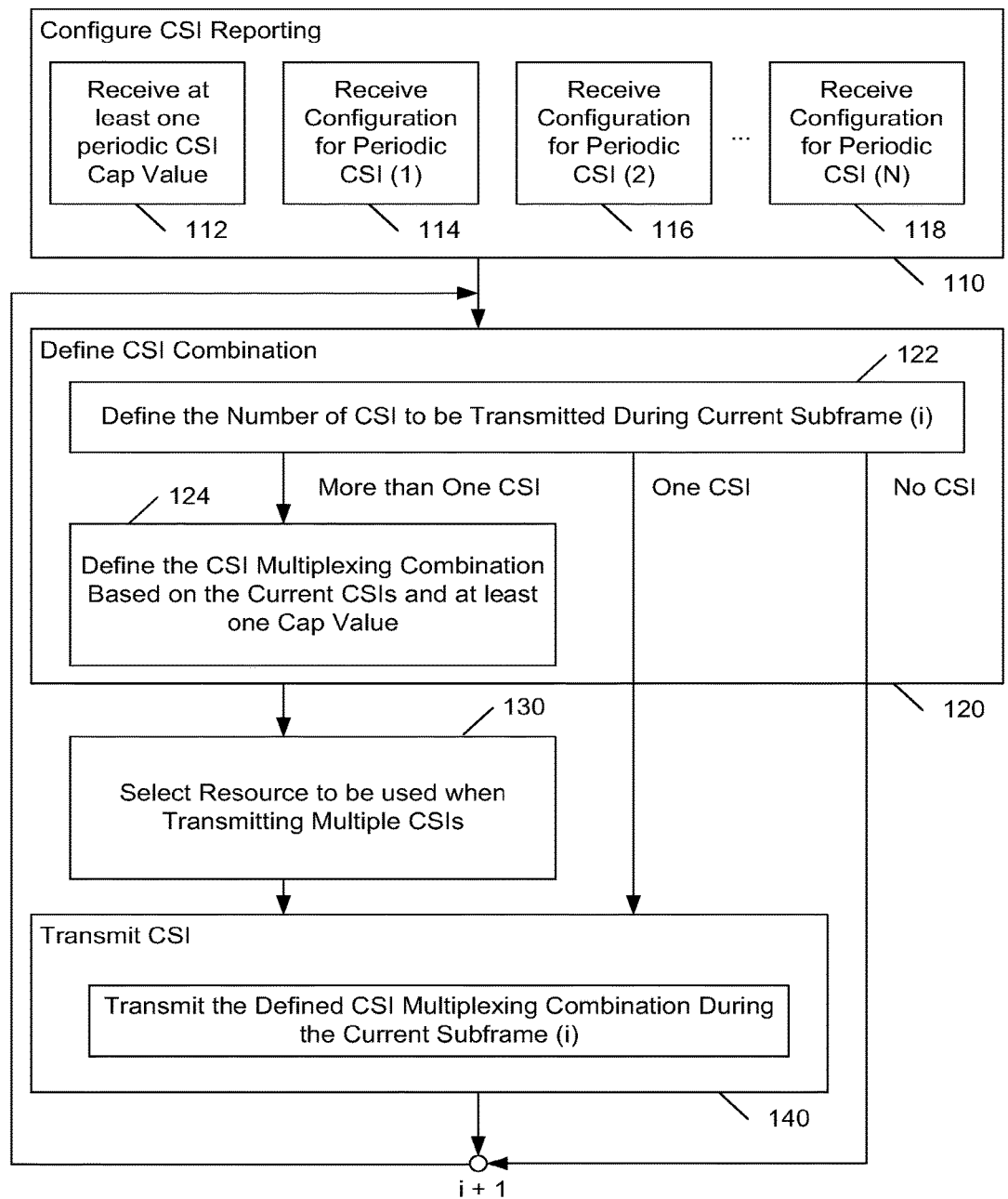
FIG. 1 illustrates an embodiment involving configurable channel state information reporting functionality.

Simultaneous transmission of multiple periodic channel state information reports can be considered in the context of a physical uplink control channel. FIG. 1 illustrates an embodiment involving configurable channel state information reporting functionality.

As shown in FIG. 1, at 110 channel state information reporting can be configured. For example, a device can receive, at 112, at least one periodic channel state information (CSI) cap value, namely a maximum number of channel state information reports that are to be provided in a single sub-frame. The channel state information cap value is merely an example, not a prerequisite. Thus, a channel state information cap value may not be present in certain embodiments.

At 114, the device can receive a configuration for a first periodic channel state information reporting pattern. At 116, the receiver can receive a configuration for a second periodic channel state information reporting pattern. Similarly, the device can receive more such configurations to a final configuration for periodic channel state information reporting pattern N, at 118. There is no particular requirement that these configurations for periodic channel state information reporting patterns need to be received in order or even in a same time period as one another.

Then, at 120, a combination of channel state information reports is defined in the device. Specifically, at 122, the number of the channel state information reports to be transmitted during a current subframe (i) can be defined. If no channel state information reports are to be transmitted in a current system, the process may loop back to defining a channel state information combination in a next subframe (subframe i+1).

If only a single channel state information report is to be sent, then at 140 the single channel state information report can be sent. If multiple channel state information reports are to be sent, then at 124 the multiplexing combination to be sent can be based on the current channel state information reports and a predetermined rule to select the reports to be transmitted such as at least one cap value. Here, a cap value is merely one example of a predetermined rule. Other criteria can be applied, such as hierarchy of channel state information based on their importance or based on the ability to derive one information from another.

Then, at 130, resources can be selected to be used when transmitting multiple channel state information reports, as will be discussed below. Finally, at 140, the defined channel state information report combination can be multiplexed and transmitted during a current subframe (i) using the format defined for the selected resource. The process can then loop back to perform the same considerations with respect to a next subframe (i+1).

Certain embodiments provide physical uplink control channel resource allocation that can permit multiplexing plurality of periodic channel state information reports into the same subframe while maintaining single carrier properties of the transmitted uplink (UL) signal. More particularly, when the need to transmit multiple periodic channel state information reports simultaneously (in the same subframe) occurs, certain embodiments provide the eNodeB and the user equipment (UE) with resource allocation rules for selecting what physical uplink control channel resource the user equipment should use.

Figure 2:
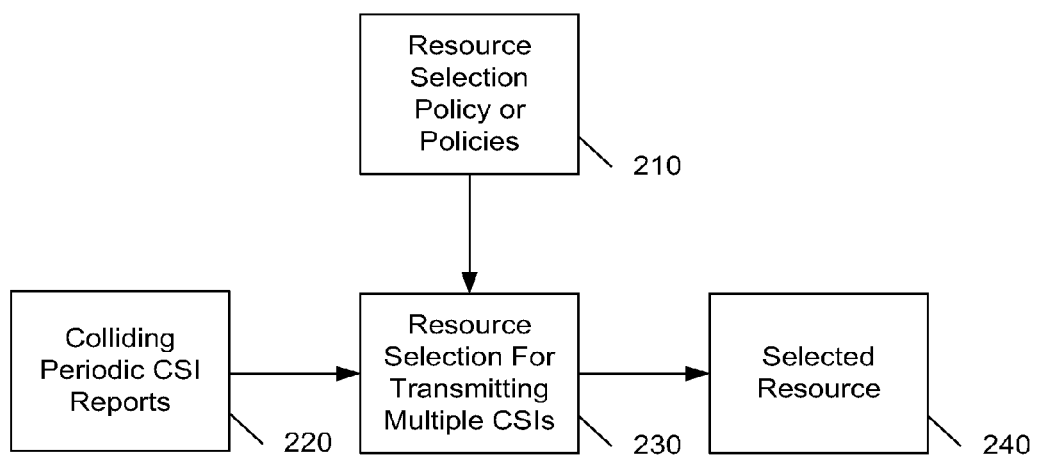
FIG. 2 illustrates resource selection according to certain embodiments.

Thus, in certain embodiments, the periodic channel state information reporting can include multiple periodic channel state information reporting configurations (CQI-ReportConfig) each having dedicated physical uplink control channel resource index and possibly also different physical uplink control channel resource type configured. FIG. 2 illustrates resource selection according to certain embodiments.

As shown in FIG. 2, at 220, there may be at least two colliding channel state information (CSI) reports to be transmitted during the same subframe on at least two resources, with the case where the two resources are the same being considered as a special case. At 210, resource selection policy or policies can define the rules to select a particular physical uplink control channel resource among a plurality of resources. Different policies may be used for different physical uplink control channel resource type mixes. At least three mixes can be as follows: N×Format 2 (N>1), N×Format 3 (N>1), and N×Format 2+M×Format 3 (N>0, M>0). Mixes related to periodic channel state information reporting taking place on physical uplink shared channel can also be included.

In FIG. 2, at 230, resource selection can be made for multiple simultaneous transmissions of channel state information reports. The presence of simultaneous acknowledgement (ACK) and negative acknowledgment (NACK) (A/N) resource(s) (e.g., Format 3) can be taken into account when simultaneous transmission of a channel state indicator and carrier aggregation (CA) HARQ-ACK on the physical uplink control channel is supported and configured. This selection can yield, at 240, the selected resource, and the system can transmit the channel state information on that selected resource. Detailed policies will be discussed below.

Figure 4:
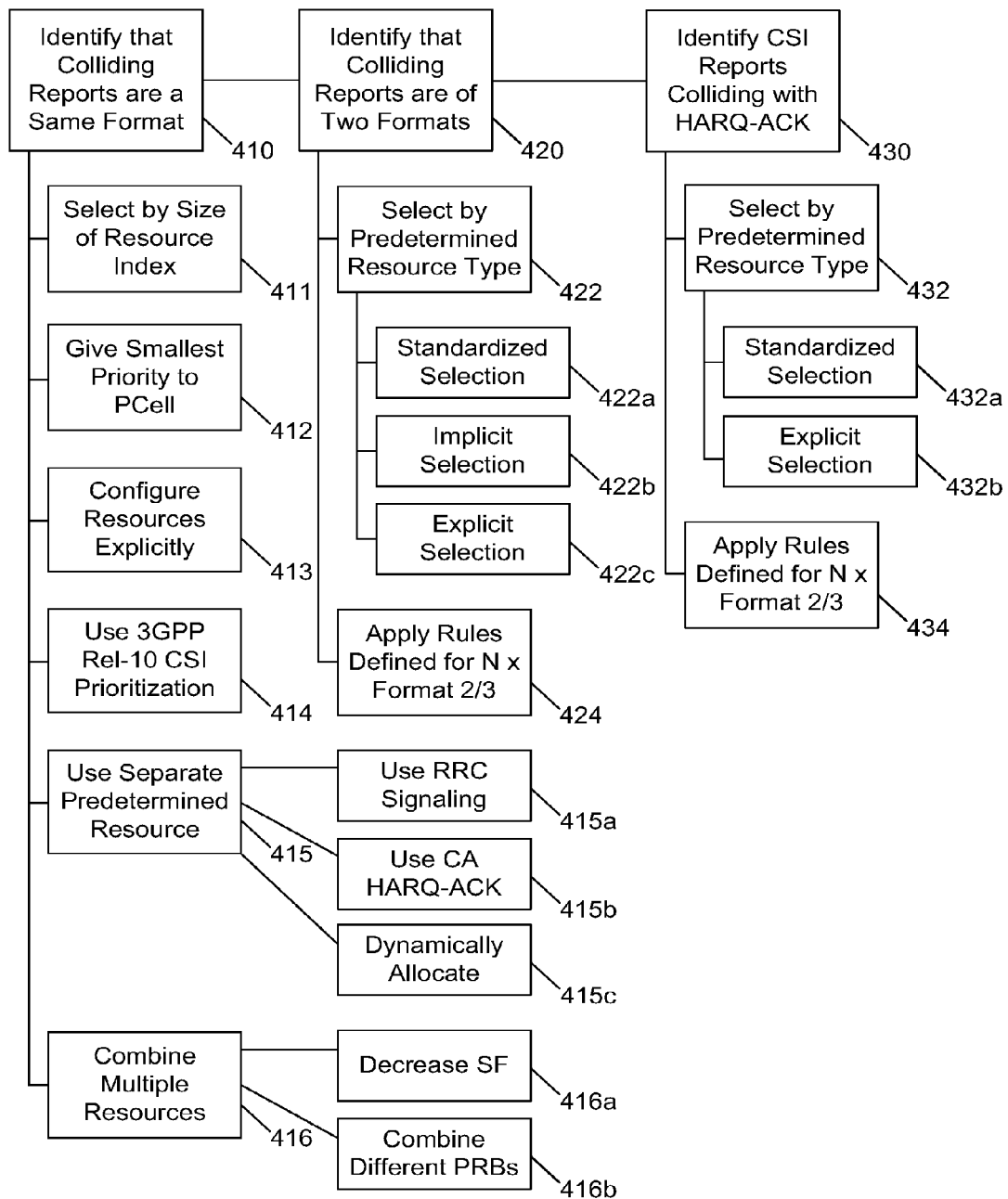
FIG. 4 illustrates resource assignment according to certain embodiments.

FIG. 4 illustrates resource assignment according to certain embodiments. As shown in FIG. 4, at 410 it may be identified that all colliding reports use the same format. Thus, a number of reports (N) can be format 2 or 3 or periodical physical uplink shared channel (PUSCH) reports. Thus, for example, there can be collision of at least two channel state information reports occupying different physical uplink control channel format 2 or format 3 resources ($n_{PUCCH}^{(2,p)}/n_{PUCCH}^{(3,p)}$). The term "colliding" can refer to a situation in which multiple reports are to be transmitted in a same period in time, that is, simultaneously. Thus, this may be a collision at the time of scheduling transmission rather than a collision during transmission. An example of such collision is that two channel state information reports need to be transmitted on a physical uplink control channel during the same subframe.

There are several options available to define the transmitted channel state information resource. Those options include selecting a resource according to predetermined rules. For example, a resource with smallest (or largest) resource index can be selected in preference to other resources at 411. It is also possible to define the priority order according to a cell index to which the channel state information report relates. One option is the give the smallest priority to the reports corresponding to a primary cell (PCell), at 412. This may help to identify certain error cases related to media access control (MAC) level activation/deactivation of a secondary cell (SCell).

Another option is to configure resource priority explicitly, at 413. Explicit resource priority configuration can be performed, for example, using radio resource control (RRC) signaling. Alternatively, at 414, the channel state information reporting prioritization rules agreed for carrier aggregation in 3rd generation partnership project (3GPP) long term evolution (LTE) release 10 (Rel-10) can also be used to determine the resource to be used. For example, the reports can be primarily sorted depending on the report type and secondarily according to the cell index (smallest first).

Especially when physical uplink control channel format 2 reports collide, an option, at 415, is to transmit the combined channel state information report on a separate, predetermined resource using a PUCCH/PUSCH format with larger payload (for example, Format 3). The separate resource may be configured using radio resource control signaling, at 415a. Alternatively, the separate resource may be the resource(s) configured for carrier aggregation (CA) hybrid automatic repeat request acknowledgment (HARQ-ACK) signaling, at 415b. The resource to be used can follow the acknowledgement/negative acknowledgement resource indicator (ARI) index. It is also possible to allocate separate resource in dynamic manner, at 415c. For example, on a need basis the separate resource can be allocated using a physical downlink control channel (PDCCH).

Yet another option is, at 416, allowing combining of multiple resources (for example, Format 3) into a single resource to increase the payload while still maintaining the single carrier properties of the transmitted signal. For example, two resources on the same physical resource block (PRB) can be combined using a decreased spreading factor (SF), at 416a. For example, 2×SF4 can be combined using 1×SF2. Another example is that two resources on different physical resource blocks can be combined into a single resource, at 416b. This combination of different physical resource blocks can be made in a single carrier way when the two resources are on neighboring physical resource blocks.

Alternatively, at 420, a system may identify that the colliding reports are occupying (or attempting to occupy) resources of at least two formats. For example, there may be a first number (N) of reports for Format 2 and a second number (M) of reports for Format 3. Thus, there may be collision of at least two channel state information reports occupying both Format 2 ($n_{PUCCH}^{(2,p)}$) and Format 3 ($n_{PUCCH}^{(3,p)}$) resources. There are several options available to define the transmitted channel state information resource(s). For example, at 422, resources can be selected according to predetermined resource type. For example, at 422a, a resource selection rule may be predetermined by a standardized rule. For example, Format 3 may always be prioritized over Format 2. Alternatively, the resource selection rule may be given implicitly at 422b. For example, a resource type can be selected according to a maximum payload supported. In a further alternative, at 422c, the prioritized resource type can be configured explicitly, for example, using radio resource control signaling.

If there are multiple resources available corresponding to the selected resource type(s), then at 424, rules defined for N×Format 2/3 can be applied. Certain embodiments can similarly apply to channel state information enhancements involving periodical physical uplink shared channel. For example, certain embodiments can apply to a combination of physical uplink control channel format 2/3 together with periodical physical uplink shared channel.

Alternatively, the system can determine, at 430, that there is at least one channel state information report (in either format two or three, or any other format) and at least one hybrid automatic repeat request acknowledgment (for example, format 3 for HARQ-ACK).

For example, there can be a collision between HARQ-ACK using Format 3 with a number (N) of channel state information report(s) occupying Format 2 ($n_{PUCCH}^{(2,p)}$) and/or Format 3 ($n_{PUCCH}^{(3,p)}$) resources. Simultaneous transmission of channel state indicator(s) and HARQ-ACK on a physical uplink control channel can be configured as alternative to having channel state information dropped (that is, omitted) and only HARQ-ACK transmitted.

There can be various options for handling this situation. For example, at 432, the system can select a resource according to predetermined signaling type. For example, HARQ-ACK signaling can be predetermined to take place on physical uplink control channel format 3. The resource selection rule may be predetermined by the standard at 432a. Alternatively, the resource selection rule can be configured explicitly at 432b. Radio resource control signaling is one way to provide explicit configuration of the resource selection rule. If there are multiple resources available corresponding to a selected resource type, then rules defined for N×Format 2/3 can be applied at 434.

Figure 3:
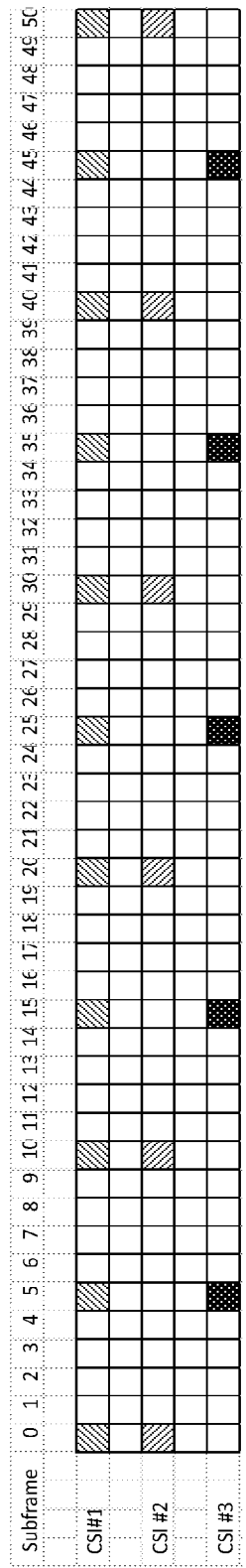
FIG. 3 illustrates an example of resource assignment and/or selection according to certain embodiments.

When the colliding channel state information reports are configured with the same resource, various approaches can be used. FIG. 3 illustrates an example of resource assignment and/or selection according to certain embodiments.

More particularly, FIG. 3 provides an exemplary resource allocation scheme containing three parallel channel quality indicator (CQI) reporting configurations, using a different cross-hatching for each configuration. The assumptions behind these options are that channel state information reporting includes multiple periodic channel state information reporting configurations (CQI-ReportConfig) and resource allocation follows a tree structure within the primary channel state information configuration in which the primary channel state information configuration corresponds to a channel state information report (CQI-ReportConfig) with the smallest channel state information/precoder matrix indicator (PMI) periodicity (CSI#1 in FIG. 3).

In FIG. 3, a channel state information report corresponding to multiple carriers and/or cells is configured in such a way that the same physical uplink control channel resource index (that is, $n_{PUCCH}^{(2,p)}$) but different CQI/PMI periodicity and offset configuration (that is, ICQI/PMI parameter) are configured to different channel state indicator reporting schemes (CQI-ReportConfig). Moreover, in FIG. 3, the CQI/PMI periodicity and offset configuration are defined in such a way that the total resource consumption corresponds to that of CQI-ReportConfig with the primary configuration. Furthermore, in FIG. 3, multiplexing rules defining which of the periodic channel state information reports (CQI-ReportConfig) are transmitted simultaneously ensure that a single physical uplink control channel resource (corresponding to the maximum CQI/PMI periodicity) is able to carry the configured CSI combinations (in predetermined way).

Certain embodiments, such as those illustrated by FIG. 3 may be able to minimize physical uplink control channel resource consumption while maintaining modularity in forming a desired mix of channel state information reporting configurations. Moreover, certain embodiments provide a generic resource allocation framework for cases related to simultaneous transmission of multiple channel state information reports (that is, channel state information for, for example, multiple cells) on a physical uplink control channel during the same subframe. Moreover, certain embodiments allow maximization of performance of multiple simultaneous channel state information report, in that certain embodiments provide support for selection of the resource providing the best performance. Single carrier properties of the transmitted signal can be maintained in all cases in certain embodiments. Moreover, the case when colliding channel state information reports are configured with the same resource in certain embodiments supports full flexibility for the channel state information report configuration consisting of per cell/carrier reporting configurations. The flexibility can be further enhanced by means of configurable multiplexing rules.

Figure 5:
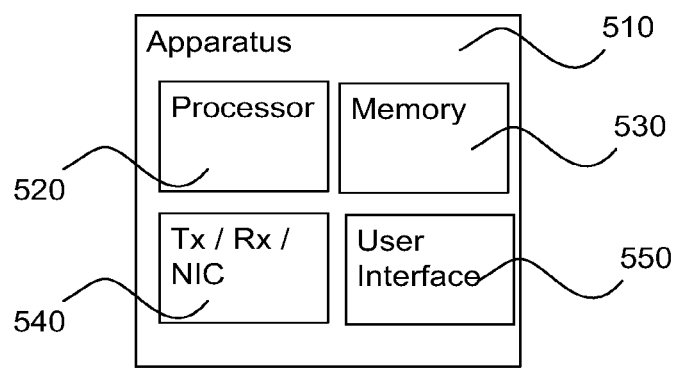
FIG. 5 illustrates an apparatus according to certain embodiments.

FIG. 5 illustrates an apparatus according to certain embodiments of the present invention. As shown in FIG. 5, an apparatus 510 can be a handset, smart phone, tablet, laptop computer, or other device. The apparatus 510 can include at least one processor 520 and at least one memory 530 including computer program instructions.

The at least one processor 520 can be variously embodied by any computational or data processing device, such as a central processing unit (CPU) or application specific integrated circuit (ASIC). The at least one processor 520 can be implemented as one or a plurality of controllers.

The at least one memory 530 can be any suitable storage device, such as a non-transitory computer-readable medium. For example, a hard disk drive (HDD) or random access memory (RAM) can be used in the at least one memory 530. The at least one memory 530 can be on a same chip as the at least one processor 520, or may be separate from the at least one processor 520.

The computer program instructions may be any suitable form of computer program code. For example, the computer program instructions may be a compiled or interpreted computer program.

The at least one memory 530 and computer program instructions can be configured to, with the at least one processor 520, cause a hardware apparatus (for example, apparatus 510) to perform a process, such as the process shown in FIG. 1, 2, or 4, or any other process described herein.

The apparatus 510 can also include communications equipment, such as a transmitter (Tx), receiver (Rx), or network interface card (NIC) 540. The Tx/Rx/NIC 540 can be configured to communicate over a wireless connection with one or more access points via one more antennas.

The apparatus 510 can also be equipped with a user interface 550. The user interface 550 can be any type of audio or visual (or both) display. For example, the user interface 550 can include a liquid crystal display or an organic electroluminescent display. The user interface 550 can be equipped with a touch-sensitive screen and haptic feedback. The user interface 550 can alternatively be projector. Other user interface types are also permitted.

Thus, in certain embodiments, a non-transitory computer-readable medium can be encoded with computer instructions that, when executed in hardware (such as apparatus 510) perform a process, such as one of the processes described above. Alternatively, certain embodiments of the present invention may be performed entirely in hardware.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

GLOSSARY

A/N, ACK/NACK Acknowledgement/Negative Acknowledgement
ARI Ack/Nack Resource Indicator
CA Carrier Aggregation
CC Component Carrier
CoMP Coordinated Multipoint
CQI Channel Quality Indicator
CSI Channel State Indicator or Channel State Information
DL Downlink
NB 3G Base Station, Node B
eICIC enhanced Inter-Cell Interference Coordination eNB LTE Base Station, evolved Node B
FDD Frequency Division Duplexing
HARQ Hybrid Automatic Repeat Request
LTE Long Term Evolution
PCell Primary Cell
PMI Precoder Matrix Indicator
PRACH Physical Random Access Channel
PRB Physical Resource Block
PTI Precoder Type Indicator
PUCCH Physical Uplink Control Channel
PUSCH Physical Uplink Shared Channel
RI Rank Indicator
SCell Secondary Cell
SRS Sounding Reference Signal
TDM Time Division Multiplexing
UE User Equipment
UL Uplink
X2 Standardized signaling interface between eNBs

We claim:

1. A method, comprising:
   determining, by an apparatus, that at least two reports to be transmitted on an uplink resource collide with respect to the uplink resource, wherein the at least two reports includes at least one channel state information report, and in response to determining a collision, performing at least the following:
   applying, by the apparatus, at least one resource selection policy to the at least two reports, comprising defining a priority order of the at least two reports, wherein the priority order is based on a cell index to which the at least one channel state information report relates, and wherein the at least one resource selection policy comprises determining using at least one predetermined rule a maximum number of channel state information reports that are to be provided in a single sub-frame;
   selecting, by the apparatus, a resource and format according to the at least one predetermined rule to be used for transmitting the at least two reports, wherein the resource is selected based on a maximum payload supported and based on the determined maximum number of channel state information reports that are to be provided in the single sub-frame; and
   transmitting, by the apparatus, the at least two reports using the selected resource and format.

2. The method of claim 1, wherein the at least two reports further include at least one additional channel state information report or at least one hybrid automatic repeat request acknowledgment.

3. The method of claim 1, wherein the at least two reports includes at least one channel state information report related to at least one of carrier aggregation and coordinated multipoint operation.

4. The method of claim 2, wherein the at least one additional channel state information report is of a different type from the first channel state indicator report.

5. The method of claim 2, wherein the at least one additional channel state information report is of a same type as the first channel state indicator report.

6. The method of claim 1, wherein the policy comprises a standardized policy.

7. The method of claim 1, wherein the policy comprises selecting a resource with a largest or smallest resource index.

8. The method of claim 1, wherein the resource selection policy is based on a cell index to which the report relates.

9. The method of claim 1, wherein a report corresponding to a primary cell is given a lowest priority.

10. The method of claim 1, wherein the resource is a separate, predetermined resource that is configured to use a physical uplink control channel format or physical uplink shared channel format.

11. The method of claim 1, wherein:
    determining further comprises determining that multiple colliding reports use a same format; and
    selecting the resource based on a maximum payload supported further comprises selecting a resource with a smallest resource index according to the at least one predetermined rule, wherein the format selected for the resource is the same format used by the multiple colliding reports.

12. The method of claim 1, wherein:
    determining further comprises determining that multiple colliding reports use a same format; and
    selecting the resource based on a maximum payload supported further comprises selecting a resource with a largest resource index according to the at least one predetermined rule, wherein the format selected for the resource is the same format used by the multiple colliding reports.

13. The method of claim 1, wherein:
    determining further comprises determining that multiple colliding reports use a same format;
    selecting the resource further comprises selecting a resource and the same format for one of the multiple colliding reports according to the at least one predetermined rule; and
    transmitting further comprises transmitting the at least two reports using at least the resource and same format for the one of the multiple colliding reports and not transmitting other ones of the multiple colliding reports.

14. An apparatus, comprising:
    at least one processor; and
    at least one memory including computer program instructions, wherein the at least one memory and the computer program instructions are configured to, with the at least one processor, cause the apparatus at least to:
    determine that at least two reports to be transmitted on an uplink resource collide with respect to the uplink resource, wherein the at least two reports includes at least one channel state information report, and in response to determining a collision, performing at least the following:
    apply at least one resource selection policy to the at least two reports, comprising defining a priority order of the at least two reports, wherein the priority order is based on a cell index to which the at least one channel state information report relates, and wherein the at least one resource selection policy comprises determining using at least one predetermined rule a maximum number of channel state information reports that are to be provided in a single sub-frame;
    select according to the at least one predetermined rule a resource to be used for transmitting the at least two reports, wherein the resource is selected based on a maximum payload supported and based on the determined maximum number of channel state information reports that are to be provided in the single sub-frame; and
    transmit the at least two reports using the selected resource and format.

15. The apparatus of claim 14, wherein the at least two reports further include at least one additional channel state information report or at least one hybrid automatic repeat request acknowledgment.

16. The apparatus of claim 14, wherein the at least two reports includes at least one channel state information report related to at least one of carrier aggregation and coordinated multipoint operation.

17. The apparatus of claim 16, wherein the at least one additional channel state information report is of a different type from the first channel state indicator report.

18. The apparatus of claim 16, wherein the at least one additional channel state information report is of a same type as the first channel state indicator report.

19. The apparatus of claim 14, wherein the policy comprises a standardized policy.

20. The apparatus of claim 14, wherein the policy comprises selecting a resource with a largest or smallest resource index.

21. The apparatus of claim 14, wherein the resource selection policy is based on a cell index to which the report relates.

22. The apparatus of claim 14, wherein a report corresponding to a primary cell is given a lowest priority.

23. The apparatus of claim 14, wherein the resource is a separate, predetermined resource that is configured to use a physical uplink control channel format or physical uplink shared channel format.

24. A non-transitory computer readable medium encoded with instructions that, when executed in hardware, perform a process, the process comprising at least the following:
    determining that at least two reports to be transmitted on an uplink resource collide with respect to the uplink resource, wherein the at least two reports includes at least one channel state information report, and in response to determining a collision, performing at least the following:
    applying at least one resource selection policy to the at least two reports, comprising defining a priority order of the at least two reports, wherein the priority order is based on a cell index to which the at least one channel state information report relates, and wherein the at least one resource selection policy comprises determining using at least one predetermined rule a maximum number of channel state information reports that are to be provided in a single sub-frame;
    selecting a resource and format according to the at least one predetermined rule to be used for transmitting the at least two reports, wherein the resource is selected based on a maximum payload supported and based on the determined maximum number of channel state information reports that are to be provided in the single sub-frame; and
    transmitting the at least two reports using the selected resource and format.

* * * * *